US011852791B2

(12) United States Patent
Sasaki et al.

(10) Patent No.: US 11,852,791 B2
(45) Date of Patent: *Dec. 26, 2023

(54) ANAMORPHIC PHOTOGRAPHY AND SQUEEZE RATIOS FOR DIGITAL IMAGERS

(71) Applicant: Panavision International, L.P., Woodland Hills, CA (US)

(72) Inventors: Daniel Keith Sasaki, Glendale, CA (US); Haluki Sadahiro, Oak Park, CA (US)

(73) Assignee: Panavision International, L.P., Woodland Hills, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/397,991

(22) Filed: Aug. 10, 2021

(65) Prior Publication Data

US 2022/0026689 A1 Jan. 27, 2022

Related U.S. Application Data

(63) Continuation of application No. 16/748,644, filed on Jan. 21, 2020, now Pat. No. 11,086,109, which is a continuation of application No. 15/642,260, filed on Jul. 5, 2017, now Pat. No. 10,539,764.

(51) Int. Cl.
  *G02B 13/08* (2006.01)
  *G06T 5/20* (2006.01)
  *G02B 27/09* (2006.01)
  *G03B 37/06* (2021.01)

(52) U.S. Cl.
  CPC ......... *G02B 13/08* (2013.01); *G02B 27/0966* (2013.01); *G03B 37/06* (2013.01); *G06T 5/20* (2013.01); *G06T 2200/12* (2013.01)

(58) Field of Classification Search
  CPC .... G02B 13/08; G02B 27/0025; G02B 5/208; G02B 7/09; G02B 27/0966; G03B 37/06; G06T 2200/12; G06T 5/20
  See application file for complete search history.

(56) References Cited

U.S. PATENT DOCUMENTS

| 2,890,622 | A | | 6/1959 | Wallin |
| 4,712,884 | A | * | 12/1987 | Sakuma ............. G02B 13/0005 359/662 |
| 7,148,947 | B2 | | 12/2006 | Miyagishima et al. |

(Continued)

FOREIGN PATENT DOCUMENTS

| CN | 101111795 A | 1/2008 |
| GB | 2430272 A | 3/2007 |

(Continued)

OTHER PUBLICATIONS

International Preliminary Report on Patentability dated Jun. 10, 2018 in corresponding International Application No. PCT/US2016/069489 filed Dec. 30, 2016; total 9 pages.

(Continued)

*Primary Examiner* — Christopher K Peterson
(74) *Attorney, Agent, or Firm* — Snell & Wilmer L.L.P.

(57) ABSTRACT

A digital camera comprising a digital image sensor and at least one corrective lens element configured to reduce a blurring of an image in a horizontal or vertical dimension on the digital image sensor. The digital image sensor may be larger than a 28 millimeter diagonal.

17 Claims, 7 Drawing Sheets

(56) References Cited

U.S. PATENT DOCUMENTS

| | | | |
|---|---|---|---|
| 10,539,764 B2* | 1/2020 | Sasaki | G06T 5/20 |
| 11,086,109 B2* | 8/2021 | Sasaki | G02B 13/08 |
| 2005/0083405 A1 | 4/2005 | Imoto et al. | |
| 2005/0212931 A1 | 9/2005 | Gallagher et al. | |
| 2006/0039055 A1* | 2/2006 | Hendriks | G11B 7/1374 |
| 2006/0050403 A1 | 3/2006 | Neil | |
| 2007/0052833 A1 | 3/2007 | Matsui et al. | |
| 2007/0081257 A1* | 4/2007 | Bowron | G02B 13/12 359/668 |
| 2009/0052050 A1 | 2/2009 | Kweon et al. | |
| 2010/0060992 A1 | 3/2010 | Hirose | |
| 2010/0238328 A1* | 9/2010 | Pillman | H04N 5/217 348/E5.079 |
| 2010/0295985 A1 | 11/2010 | Matsusaka | |
| 2012/0320347 A1 | 12/2012 | Morikuni et al. | |
| 2013/0335601 A1 | 12/2013 | Shiota et al. | |
| 2015/0212301 A1 | 7/2015 | Neil | |
| 2015/0256655 A1 | 9/2015 | Jannard | |
| 2015/0301313 A1 | 10/2015 | Lipton et al. | |
| 2016/0170173 A1* | 6/2016 | Macintosh | G02B 15/02 359/668 |
| 2016/0360112 A1 | 12/2016 | Shigemitsu | |
| 2017/0192210 A1 | 7/2017 | Sasaki et al. | |

FOREIGN PATENT DOCUMENTS

| | | | |
|---|---|---|---|
| JP | 2005300902 A | | 10/2005 |
| WO | 2006023276 A1 | | 3/2006 |
| WO | 2008062661 A1 | | 5/2008 |
| WO | WO2013065391 | | 5/2013 |

OTHER PUBLICATIONS

International Search Report and Written Opinion dated Jun. 12, 2017 in corresponding International Application No. PCT/US2016/069489 filed Dec. 30, 2016; total 18 pages.
International Search Report dated Oct. 5, 2018 in corresponding International Application No. PCT/US2018/040652 filed Jul. 2, 2018; total 3 pages.
Written Opinion of the International Searching Authority dated Oct. 5, 2018 in corresponding International Application No. PCT/US2018/040652 filed Jul. 2, 2018; total 7 pages.
International Preliminary Report on Patentability dated Jan. 7, 2020 in corresponding International Applicatin No. PCT/US2018/040652 filed Jul. 2, 2018; total 8 pages.
Non-Final Office Action dated Sep. 20, 2018 in U.S. Appl. No. 15/394,401, filed Dec. 29, 2016; total 27 pages.
Final Office Action dated Jun. 13, 2019 in corresponding U.S. Appl. No. 15/394,401, filed Dec. 29, 2016; total 23 pages.
Advisory Action dated Sep. 6, 2019 in corresponding U.S. Appl. No. 15/394,401, filed Dec. 29, 2016; total 3 pages.
Notice of Allowance dated Oct. 11, 2019 in corresponding U.S. Appl. No. 15/394,401, filed Dec. 29, 2016; total 8 pages.
Non-Final Office Action dated Apr. 19, 2019 in corresponding U.S. Appl. No. 15/642,260, filed Jul. 5, 2017; total 23 pages.
Notice of Allowance dated Sep. 11, 2019 in corresponding U.S. Appl. No. 15/642,260, filed Jul. 5, 2017; total 16 pages.
Corbasson G Ed, "Production of 16/9 Aspect Ration Images with Conventional 4/3 CCD Cameras by Means of a Lens with Optical Compression", Broadcast Sessions, Montreux, Proceedings of the International Television Symposium and Technical Symposium (1991); total 19 pages.
Non-Final Office Action dated Sep. 2, 2020 in corresponding U.S. Appl. No. 16/748,644, filed Jan. 1, 2020; total 21 pages.
Notice of Allowance dated Dec. 16, 2020 in corresponding U.S. Appl. No. 16/748,644, filed Jan. 1, 2020; total 9 pages.
Notice of Allowance dated Mar. 30, 2021 in corresponding U.S. Appl. No. 16/748,644, filed Jan. 1, 2020; total 12 pages.
Notice of Allowance dated Apr. 7, 2021 in corresponding U.S. Appl. No. 16/748,644, filed Jan. 1, 2020; total 9 pages.
Non-Final Office Action dated Oct. 6, 2021 in corresponding U.S. Appl. No. 16/781,848, filed Feb. 4, 2020; total 21 pages.
Office Action dated Mar. 22, 2022 in U.S. Appl. No. 16/781,848.
Office Action dated Aug. 23, 2022 in U.S. Appl. No. 16/781,848.
Notice of Allowance dated Jul. 21, 2023 in U.S. Appl. No. 16/781,848.

* cited by examiner

ANAMORPHIC PHOTOGRAPHY AND SQUEEZE RATIOS FOR DIGITAL IMAGERS

CROSS-REFERENCE TO RELATED APPLICATIONS

This patent application is a continuation of and claims priority to U.S. patent application Ser. No. 16/748,644 filed Jan. 21, 2020, now U.S. Pat. No. 11,086,109, which is a continuation of U.S. patent application Ser. No. 15/642,260 filed Jul. 5, 2017, now U.S. Pat. No. 10,539,764, which applications are hereby incorporated by reference in their entirety.

BACKGROUND

Anamorphic camera systems have been utilized to capture a widescreen aspect ratio on film that has a smaller aspect ratio, such as standard 35 mm film. For example, in the standard Panavision anamorphic system, a widescreen image having an aspect ratio of 2.4:1 is compressed in a horizontal dimension by a factor of 2, to be captured on 35 mm film at an aspect ratio of 1.2:1. The horizontal compression allows a higher resolution image to be stored on 35 mm film than would otherwise be allowed if a 2.4:1 aspect ratio were stored on 35 mm film. Anamorphic lens elements are used to compress the original image to be stored on film, and are then used to expand the image again for projection in a cinema or the like.

With the expanded use of digital camera systems, further developments to anamorphic systems are required to address the needs of such digital camera systems. In addition, modifications to the anamorphic compression ratio are needed to address the aspect ratios utilized by digital imaging sensors.

SUMMARY

The systems, apparatuses, and methods disclosed herein are intended to provide for improved anamorphic systems for use with digital camera systems. In addition, modifications to the anamorphic compression ratio disclosed herein address the aspect ratios provided by digital imaging sensors.

In one embodiment, the application discloses a digital camera comprising a digital image sensor and a lens group positioned along an optical axis. The lens group includes at least one anamorphic lens element configured to compress an image in a horizontal or vertical dimension; at least one powered lens element positioned between the at least one anamorphic lens element and the digital image sensor; and at least one corrective lens element positioned between the at least one powered lens element and the digital image sensor, and configured to reduce a blurring of the image in the horizontal or vertical dimension on the digital image sensor or decomposition the image in the horizontal or vertical dimension to substantially equalize the image quality in the horizontal and vertical dimension.

In one embodiment, the application discloses a digital camera system comprising a digital image sensor including an optical low pass filter. The system includes at least one anamorphic lens element configured to compress an image in a horizontal or vertical dimension. The system includes at least one corrective lens element configured to be positioned along an optical axis between the at least one anamorphic lens element and the optical low pass filter, and configured to reduce a blurring of the image in the horizontal or vertical dimension on the digital image sensor caused by the optical low-pass filter.

In one embodiment, the application discloses a digital camera system comprising at least one anamorphic lens element configured to compress an image in a horizontal or vertical dimension by a squeeze ratio of approximately 1.29. The system includes a digital image sensor configured to receive the image compressed by the at least one anamorphic lens element.

In one embodiment, the application discloses a digital camera system comprising at least one anamorphic lens element configured to compress an image in a horizontal or vertical dimension. A digital image sensor may be configured to receive the image compressed by the at least one anamorphic lens element. At least one corrective lens element may include an anti-aliasing feature and is configured to be positioned along an optical axis with the at least one anamorphic lens element and the digital image sensor, and configured to reduce a blurring of the image in the horizontal or vertical dimension on the digital image sensor caused by the decomposition of the image in the horizontal or vertical dimension. The reduction of blurring may equalize a quality of the image in the horizontal and vertical dimension.

In one embodiment, the application discloses a digital camera system comprising a digital image sensor including an anti-aliasing filter. At least one anamorphic lens element is configured to compress an image in a horizontal or vertical dimension. At least one corrective lens element is configured to be positioned along an optical axis between the at least one anamorphic lens element and the anti-aliasing filter, and configured to reduce a blurring of the image in the horizontal or vertical dimension on the digital image sensor caused by the decomposition of the image in the horizontal or vertical dimension. The reduction of blurring may equalize a quality of the image in the horizontal and vertical dimension.

In one embodiment, the application discloses a digital camera system comprising at least one anamorphic lens element configured to compress an image in a horizontal or vertical dimension. A digital image sensor is configured to receive the image compressed by the at least one anamorphic lens element. One or more of a toroidal lens element or an anti-aliasing feature may be configured to be positioned along an optical axis between the at least one anamorphic lens element and the digital image sensor. In one embodiment, the toroidal lens element may include an anti-aliasing filter.

In one embodiment, the digital camera system may be used as part of, or combination with, a mobile electronic device.

BRIEF DESCRIPTION OF THE DRAWINGS

Features and advantages of the systems, apparatuses, and methods as disclosed herein will become appreciated as the same become better understood with reference to the specification, claims, and appended drawings wherein:

DETAILED DESCRIPTION

Figure 1:
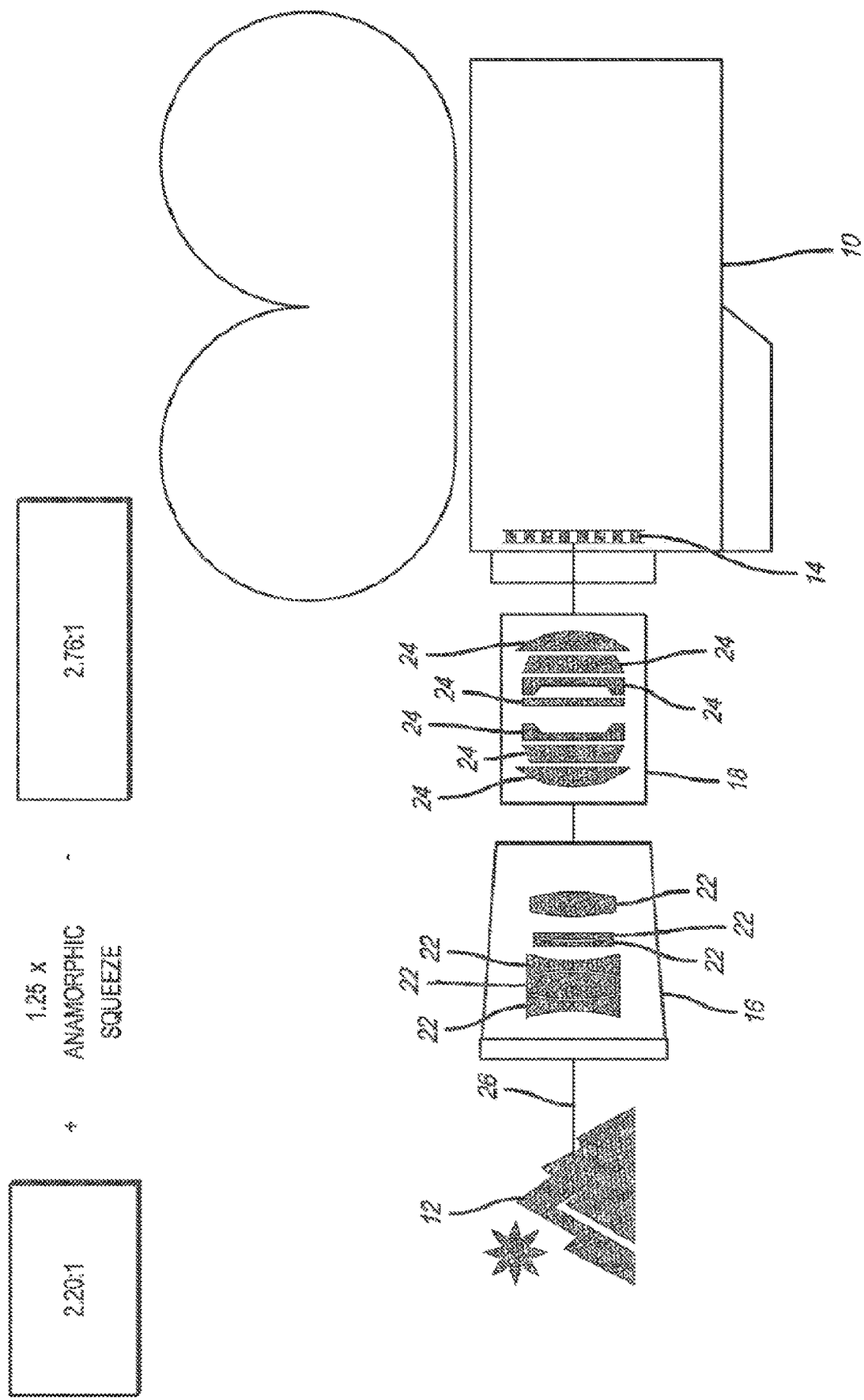
FIG. 1 illustrates a schematic view of a camera capturing an image of an object on film.

FIG. 1 illustrates a schematic view of a camera 10 utilizing an anamorphic process to capture an image of an object 12 on film 14. Anamorphic processes have been used in film applications, namely in motion picture and television filming, to provide a widescreen image capture, yet also enhance the use of the imaging area of a film. An anamorphic process includes compressing the image in a horizontal dimension, or a vertical dimension, to reduce the aspect ratio of the image as it is stored on film. During the projection of the imaged film at a later time, a reverse process is used to expand the image in the horizontal or vertical dimension, to reproduce the original uncompressed image.

An anamorphic process has been used to capture images in a system referred to as Ultra Panavision, which may include 65 millimeter (mm) film. The Ultra Panavision system includes a camera 10 having an anamorphic lens group 16, a powered lens group 18, and may include 65 mm film 14 for storing the images. The anamorphic lens group 16 includes a plurality of anamorphic lens elements 22. The anamorphic lens elements 22 are configured to compress the image in a dimension, which may be a horizontal or vertical dimension, by a squeeze ratio of between 1.19 to 1.30, which may include a ratio of 1.25, or 1.255. The squeeze ratio is the ratio of the uncompressed image aspect ratio to the compressed image aspect ratio. The anamorphic lens elements 22 may comprise a weak negative afocal system. The anamorphic lens elements 22 may comprise cylindrical lens elements, and/or prism lens elements to produce the compression in the horizontal or vertical dimension. The anamorphic lens elements 22 may include an astigmatizer, which may be similar to the variable astigmatizer disclosed in Wallin, Anamorphosing System, U.S. Pat. No. 2,890,622, issued Jun. 16, 1959, the entire contents of which are incorporated herein by reference. The variable astigmatizer may utilize weak counter-rotating cylinders (e.g., one positive and one negative, or both positive, or both negative) that balance out the axial focus position of the powered and non-powered axes when effectuating focus.

The powered lens group 18 may include spherical lens elements 24 that converge and/or diverge the afocal image produced by the anamorphic lens group 16. The powered lens group 18 may be utilized to effectuate focus of the image. The powered lens group 18 may operate in a similar manner and include similar elements as the focusing lens disclosed in Wallin, U.S. Pat. No. 2,890,622. The powered lens group 18 may be positioned along an optical axis 26 between the anamorphic lens group 16 and the film 14.

The 65 mm film 14 includes an imaging area having a width in a horizontal or vertical dimension of approximately 48.62 mm, and a height in a respective corresponding vertical or horizontal dimension of approximately 22.10 mm. The aspect ratio of the film 14 is approximately 2.20:1. The squeeze ratio of 1.25, or 1.255, allows the system to capture an image with an aspect ratio of approximately 2.76:1 on film having an aspect ratio of 2.20:1. The original widescreen aspect ratio of 2.76:1 is reproduced during projection of the imaged film at a later time. The image quality of the 65 mm film, in combination with the 2.76:1 widescreen aspect ratio, provides an enhanced viewing experience relative to standard widescreen images seen at most cinemas.

An anamorphic process used with digital cameras, has been found to produce problems not typically found with normal film emulsion capture. The problems may be present with large format digital cameras, small format digital cameras, and a variety of lesser and greater sized digital cameras (e.g., any size format). The problems may be present for cameras sized for use with mobile electronic devices such as mobile phones, smartphones, small digital cameras, music players, among others. The mobile electronic devices may include a combination of a digital camera and another feature (such as a phone and internet web browser with a smartphone). The use of a digital image sensor in digital cameras produces undesired blurring of the image, particularly in the dimension of anamorphic compression. Digital image sensors may include an optical low-pass filter having supporting filters that the chief ray and associated bundle must pass through, causing an overcorrection/under correction of the normal image correction provided by the camera optics. The filter pack within the camera may overcorrect axial aberrations and undercorrect transverse aberrations. The blurring in the horizontal dimension may include spherical aberration, coma, and astigmatism.

Figure 2:
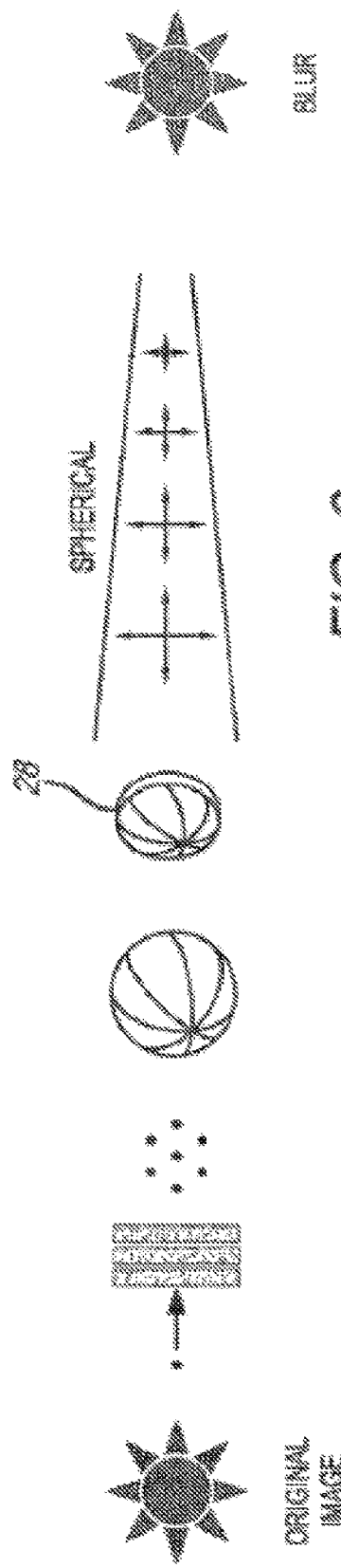
FIG. 2 illustrates a diagram of blurring using a spherical lens element.

FIG. 2 illustrates a diagram of the blurring occurring in a digital camera using a spherical lens element 28. The spherical lens element 28 compresses the original image, however, any blurring is uniform throughout the image as it is imaged on the digital image sensor.

Figure 3:
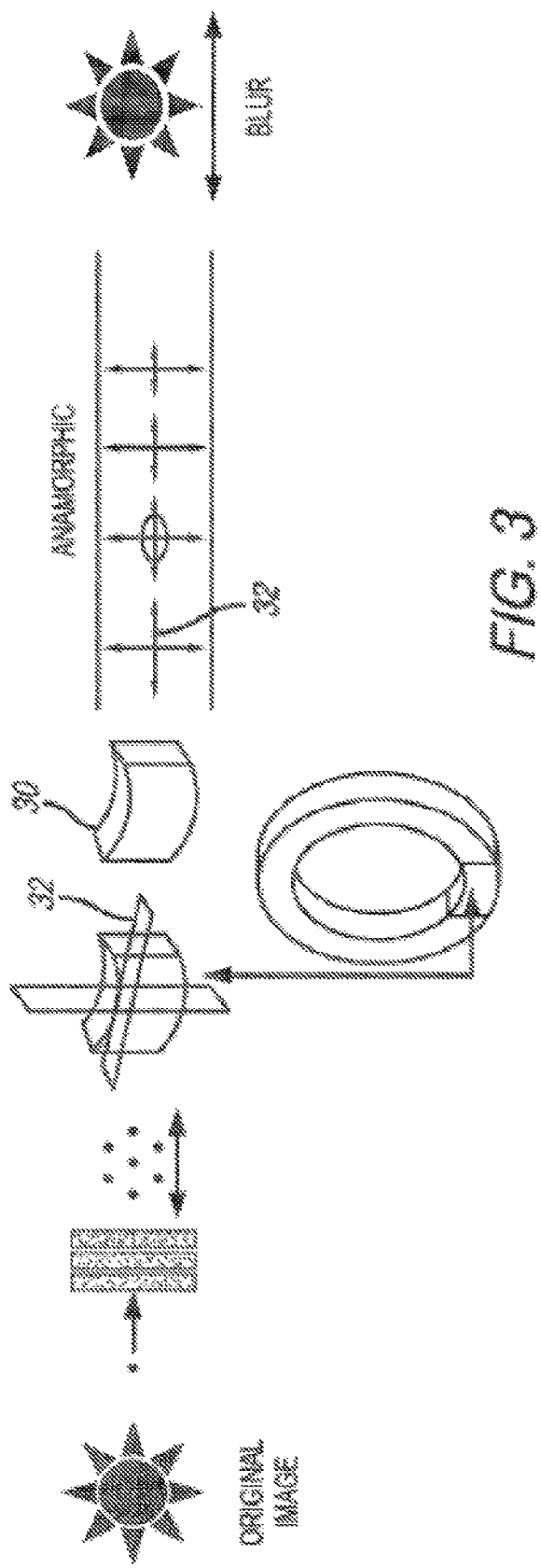
FIG. 3 illustrates a diagram of blurring using an anamorphic lens element.

FIG. 3 illustrates a diagram of the blurring occurring in a digital camera using an anamorphic lens element 30, namely a cylindrical lens element, configured to compress the image in a horizontal or vertical dimension 32. The elements of the digital image sensor produce enhanced blurring of the image in the horizontal or vertical dimension of anamorphic compression.

Figure 4:
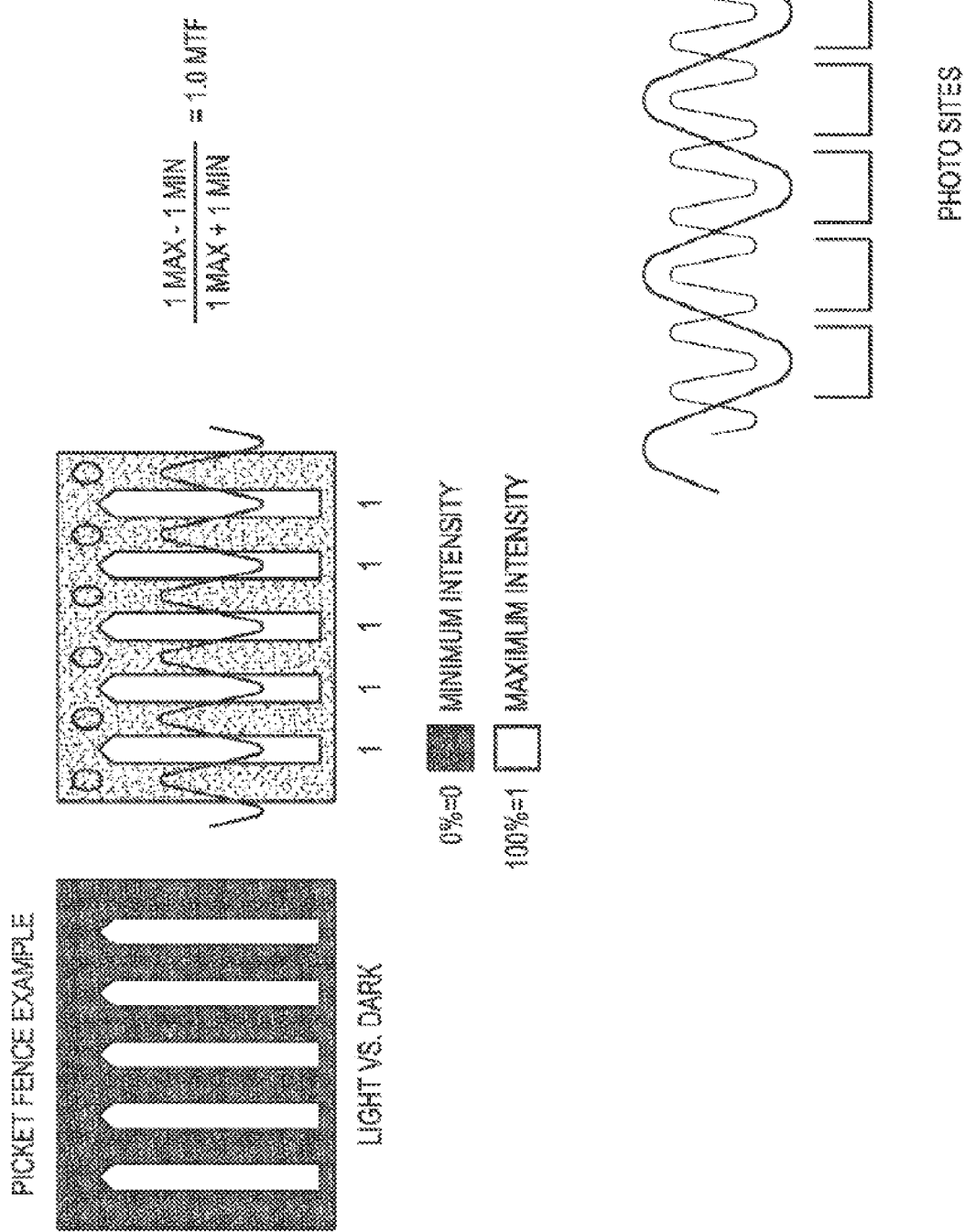
FIG. 4 illustrates a diagram of a representation of a modulation transfer function (MTF).

The digital image sensor may include a filter. The filter may include an anti-aliasing filter, an optical low-pass filter, or another form of filter. The anti-aliasing filter may comprise an optical low-pass filter. The anti-aliasing filter, and other forms of filter, may include and is not limited to a birefringent material. The aforementioned filters are unique to digital cameras, because unlike film cameras the image gets divided up into pixels on the image sensor. The filter specifically prevents any spatial frequencies not resolvable by the pixels on the sensor, which is essential to prevent common digital image artifacts. The filter, which may comprise a birefringent material, in combination with the disproportionate magnification in the dimension of anamorphic compression of the image, may result in a modulation transfer function (MTF) of the dimension of anamorphic compression compared to the orthogonal vertical or horizontal dimension that is reduced by a factor of the squeeze ratio. FIG. 4 illustrates an exemplary MTF in a dimension without anamorphic compression, which would be lesser in the dimension of anamorphic compression. Accordingly, the image is blurred in the dimension of anamorphic compression on the digital image sensor to a greater amount than the blurring in the corresponding orthogonal vertical or horizontal dimension. In an embodiment in which the anamorphic compression is in the horizontal dimension, the resulting image is not as sharp horizontally as it is vertically.

Figure 5:
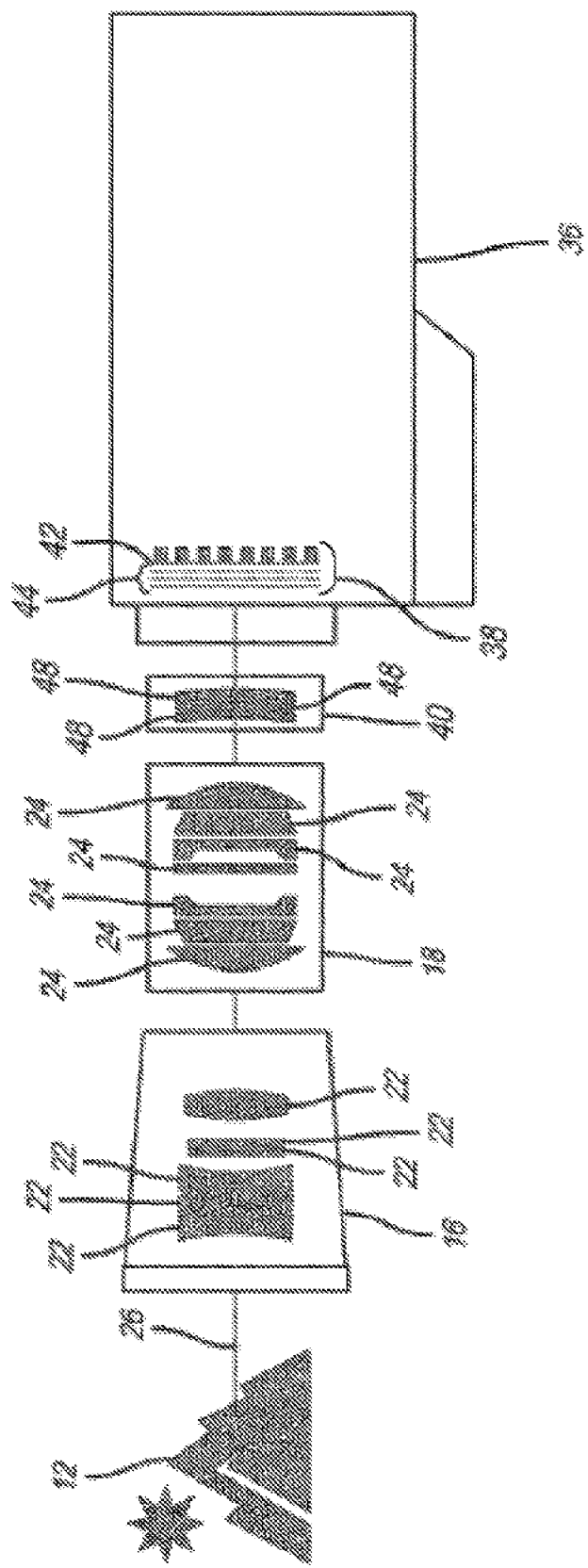
FIG. 5 illustrates a schematic view of a camera capturing an image of an object on film, according to an embodiment of the present disclosure.

FIG. 5 illustrates an embodiment of a digital camera designed to address the blurring in the dimension of anamorphic compression produced by the digital image sensor 38. The digital camera 36 may include the digital image sensor 38, an anamorphic lens group 16, a powered lens group 18, and a corrective lens group 40.

The digital image sensor 38 may include an active imaging area 42 and a filter 44, which may comprise an anti-aliasing filter, which may be an optical low-pass filter. In other embodiments, other forms of filters, and anti-aliasing filters may be utilized. In one embodiment, the anti-aliasing filter may comprise a birefringent material. In one embodiment, the digital image sensor 38 may be configured as a digital sensor with greater than about 2K resolution, and in an example embodiment is a 4K resolution digital sensor, although in other embodiments lesser (2k) or greater resolution (e.g., greater than 4K, such as 8K and greater) may be utilized as desired. In one embodiment, the digital image sensor 38 may have a Digital 65 format. The digital camera 36 may allow for the optics of a film camera to be applied to a digital image sensor 38. The optics of the digital camera 36 may capture an image having a size of approximately 48.62 mm by 22.1 mm, as with 65 mm film, yet at a 4k digital resolution.

In one embodiment, the digital image sensor 38 may be configured to have an active imaging area 42 that is approximately equal to the 48.62 mm by 22.1 mm format of 65 mm film, or greater in area than the format of 65 mm film. In one embodiment, the digital image sensor 38 may be configured to have an active imaging area with a width along the horizontal or vertical dimension that is greater than 35 mm. In one embodiment, the digital image sensor 38 may be configured to have an active imaging area with a width along the horizontal or vertical dimension that is greater than 50 mm. In one embodiment, the digital image sensor 38 may be configured to have an active imaging area with a width along the horizontal or vertical dimension that is between approximately 50 mm and 70 mm. In one embodiment, the digital image sensor 38 may have an active imaging area 42 with a width along the horizontal or vertical dimension that is greater than about 28 mm. In one embodiment, the digital image sensor 38 may have an active imaging area 42 with a width along the horizontal or vertical dimension that is greater than about 29 mm. In one embodiment, the digital image sensor 38 may have an active imaging area 42 with a width along the horizontal or vertical dimension that is greater than about 16 mm. In one embodiment, the digital image sensor 38 may have an active imaging area 42 with a width along the horizontal or vertical dimension that is greater than about 8 mm. In one embodiment, a greater or lesser size of digital image sensor 38 may be utilized.

In one embodiment, the digital image sensor 38 may be configured to have an active imaging area with a height along the vertical or horizontal dimension that is greater than about 20 mm. In one embodiment, the digital image sensor 38 may be configured to have an active imaging area with a height along the vertical or horizontal dimension that is greater than about 30 mm. In one embodiment, the digital image sensor 38 may be configured to have an active imaging area with a height along the vertical or horizontal dimension that is between approximately 25 mm and 35 mm. In one embodiment, the digital image sensor may be configured to have an active imaging area with a height along the vertical or horizontal dimension that is greater than about 14 mm.

In one embodiment, the digital image sensor may be configured to have an active imaging area with a length along a diagonal that is greater than 28 mm. In one embodiment, the digital image sensor may be configured to have an active imaging area with a length along a diagonal that is greater than 12.52 mm. In one embodiment, the digital image sensor may be configured to have an active imaging area with a length along a diagonal that is greater than 5.79 mm. In one embodiment, the digital image sensor may be configured to have an active imaging area with a length along a diagonal that is less than 8 mm. Such digital image sensors may be utilized with mobile electronic devices, which may include mobile phones, smartphones, small digital cameras, music players, and others. The mobile electronic devices may include a combination of the digital camera and another feature (such as a phone and internet web browser with a smartphone). The digital image sensor may be configured to have an active imaging area with a length along a diagonal that is less than 7 mm. The digital image sensor may be configured to have an active imaging area with a length along a diagonal that is less than 6 mm. The digital image sensor may be configured to have an active imaging area with a length along a diagonal that is less than 5 mm. The digital image sensor may be configured to have an active imaging area with a length along a diagonal that is less than 4.5 mm. The digital image sensor may be configured to have an active imaging area with a length along a diagonal that is less than 3 mm. The digital image sensor may be configured to have an active imaging area with a length along a diagonal that is less than 2 mm. In one embodiment, the digital image sensor may be configured to have an active imaging area with a length along a diagonal that greater than 1.5 mm. In one embodiment, the digital image sensor may be configured to have an active imaging area with a length along a diagonal that between than 1.5 mm and 8 mm. In other embodiments, lesser or greater lengths along diagonals may be utilized.

In one embodiment, the digital image sensor 38 may be configured to have an aspect ratio of approximately 2.2:1. In one embodiment, the digital image sensor 38 may be configured to have an aspect ratio of between approximately 1.33:1 to 1.9:1. In one embodiment, the digital image sensor may be configured to have an aspect ratio of between approximately a 1.9:1 aspect ratio to no greater than a 2.76:1 aspect ratio. In one embodiment, the heights and widths of the digital image sensor 38 may be combined or varied to different (greater or lesser) aspect ratios as desired. In one embodiment, greater than a 1.2:1 aspect ratio may be utilized. Large format digital image sensors 38 may be utilized, however, in other embodiments, other formats of digital image sensors 38 may be used as desired (e.g., small formats for mobile electronic devices). The filter 44 may comprise a single layer or type of material, or multiple layers or types of material.

The anamorphic lens group 16 may be configured similarly as the anamorphic lens group 16 discussed in regard to FIG. 1. The anamorphic lens group 16 may include a plurality of anamorphic lens elements, or may include at least one anamorphic lens element 22. The at least one anamorphic lens element 22 may be configured to compress an image in the horizontal or vertical dimension. The anamorphic lens group 16 may be configured be integral with the remainder of the lens group, or may be configured to be detachable. In an embodiment in which the lens group 16 is detachable, the digital camera 36 may be configured to alter between anamorphic capture modes and non-anamorphic capture modes. In one embodiment, the at least one anamorphic lens element 22 may comprise a part of an anamorphic lens attachment, such as the shell that reference number 16 points to in FIG. 5. The anamorphic lens attachment may detachably couple to the powered lens group 18 and the corrective lens group 40, and accordingly the body of the camera 36.

The powered lens group 18 may be configured similarly as the powered lens group 18 discussed in regard to FIG. 1. The powered lens group 18 may include a plurality of powered lens elements 24, or may include at least one powered lens element 24. The powered lens elements 24 may include spherical lens elements. The spherical lens elements may be configured to vary the magnification of the image from the anamorphic lens group 16 in all dimensions. The powered lens group 18 may be positioned between the at least one anamorphic lens element 22 and the digital image sensor 38. The powered lens group 18 may be configured be integral with the remainder of the lens group, or may be configured to be detachable in a similar manner as discussed in regard to the anamorphic lens group 16 (e.g., via a powered lens attachment such as the shell marked as reference number 18 in FIG. 5).

The corrective lens group 40 may be positioned between the powered lens group 18 and the digital image sensor 38. The corrective lens group 40 may be placed along the optical axis 26 with the anamorphic lens group 16, the powered lens group 18, and the digital image sensor 38. The corrective lens group 40 may include at least one corrective lens element 48 that is configured to reduce a blurring of the image in the dimension of anamorphic compression on the digital image sensor 38, or configured to decomposition the image in the corresponding orthogonal horizontal or vertical dimension to bring the performance in the dimension of anamorphic compression and the corresponding orthogonal horizontal or vertical dimension to unity, or to substantially equalize the image quality in the two orthogonal dimensions. The corrective lens group 40 may be configured to reduce a blurring of the image in the horizontal or vertical dimension on the digital image sensor caused by the decomposition of the image in the horizontal or vertical dimension. The reduction of blurring may substantially equalize the quality of the image in the horizontal or vertical dimension. The reduction of blurring may account for the format of the digital image sensor 38. The corrective lens group 40 may be positioned as an image side lens group relative to the anamorphic lens group 16, and may serve as a rear optic group comprising the last set of optics prior to the digital image sensor 38. The corrective lens group 40 may be configured to be integral with the remainder of the lens group, or may be configured to be detachable in a similar manner as discussed in regard to the anamorphic lens group 16 (e.g., via a corrective lens attachment such as the shell marked as reference number 40 in FIG. 5). In an embodiment in which the lens group 16 and corrective lens group 40 are detachable, the digital camera 36 may be configured to alter between anamorphic capture modes and non-anamorphic capture modes.

The at least one corrective lens element 48 may comprise a weak compensator that serves to equalize the asymmetrical blurring caused by the digital image sensor 38, which may include the blurring caused by the filter 44. In one embodiment, the at least one corrective lens element 48 may comprise a cylindrical lens element, which may be a toroidal lens element. The at least one corrective lens element 48 may be self-contained and self-cancelling, yet provide a cylindrical power. The cylindrical lens element may be configured to offset the disproportionate convolution of the image MTF between the dimension of anamorphic compression and the corresponding orthogonal horizontal or vertical dimension when imaged through a birefringent optical low-pass filter 44. In one embodiment, the power of the cylindrical lens element may be dependent on the power provided by the at least one anamorphic lens element 22. Front and rear cylindrical groups may be dependent on each other for optical corrections at the desired large format. As such, the at least one corrective lens element 48 may operate in combination with, and may be dependent on, the at least one anamorphic lens element 22. The rear cylindrical lens element may be configured to correct the spherical aberration, coma, field curvature, and astigmatism caused by the filter 44, which may be an anti-aliasing filter.

In one embodiment, the at least one corrective lens element 48 may comprise an anti-aliasing feature. The anti-aliasing feature may comprise a birefringent material. A birefringent material without anti-aliasing properties may be used in other embodiments. The birefringent material may have an orientation within the corrective lens group 40 that serves to reduce the asymmetrical blurring caused by the digital image sensor 38, which may include the blurring caused by the filter 44. The birefringent material may be configured to balance out the asymmetrical blurring by providing a calculated amount of image decomposition, which may be a function of the squeeze ratio. A single layer or type of birefringent material, or multiple layers or types of birefringent material may be utilized as desired. The birefringent material may be configured to correct the spherical aberration, coma, field curvature, and astigmatism caused by the filter 44.

In one embodiment, the at least one corrective lens element 48 may include a combination of a cylindrical lens element, such as a toroidal lens element, and an anti-aliasing feature such as a birefringent material. In one embodiment, the corrective lens group 40 may be configured as a group of adaptive optics positioned on the image side of the anamorphic lens group 16. In one embodiment, the anamorphic lens group 16 may be configured as a cylindrical lens group that operates in combination with the adaptive optics of the corrective lens group 40.

Figure 6:
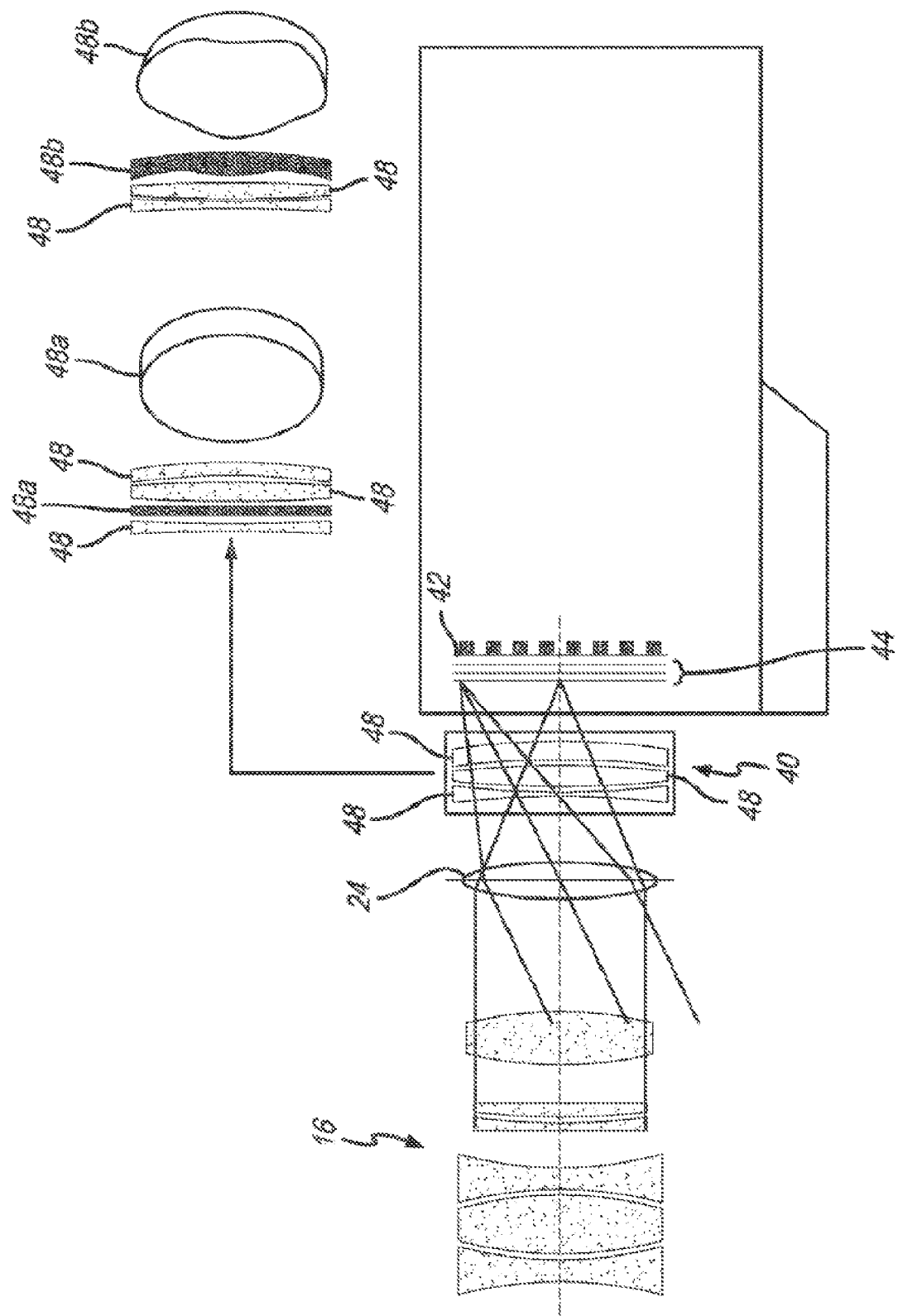
FIG. 6 illustrates a schematic view of at least one corrective lens element, according to embodiments of the present disclosure.

FIG. 6 illustrates an embodiment of the at least one corrective lens element 48 comprising an anti-aliasing feature such as birefringent material 48a. The birefringent material in one embodiment may comprise quartz, although in other embodiments, a different material may be utilized as desired. The birefringent material may be oriented orthogonal to the powered dimension. FIG. 6 illustrates an embodiment of the at least one corrective lens element 48 comprising a cylindrical lens element, which may be a toroidal lens element 48b. The toroidal lens element may comprise a weak toroidal surface facing the object side of the corrective lens group 40.

Figure 7:
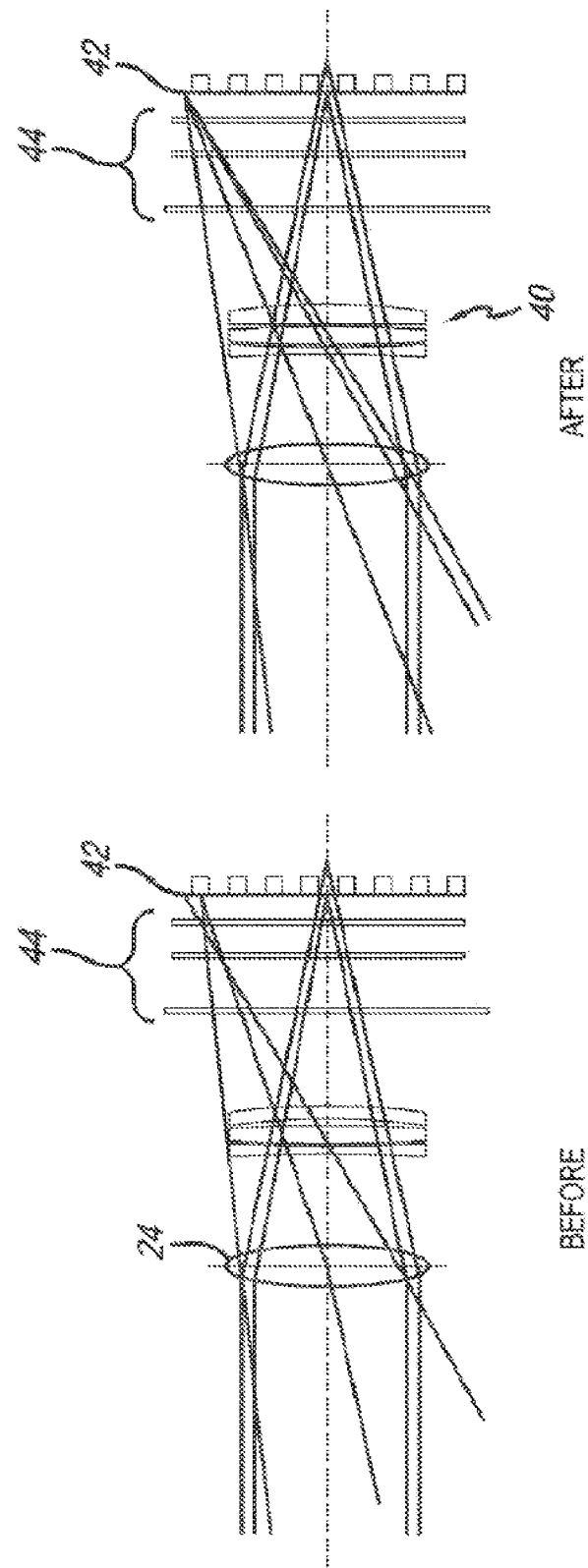
FIG. 7 illustrates a diagram of optics of a digital camera, according to an embodiment of the present disclosure.

FIG. 7 illustrates a top view of the optics of the digital camera 36 before and after correction by the at least one corrective lens element 48. Blurring in the dimension of anamorphic compression is reduced. In one embodiment, post production anti-aliasing processing, or other forms of anti-aliasing processing after capture of the images, may be performed on the resulting images.

The anamorphic lens group 16, the powered lens group 18, and the corrective lens group 40 may in combination comprise a lens group that is positioned along an optical axis 26. The anamorphic lens group 16, and the corrective lens group 40 may operate on front and rear sides of the powered lens group 18.

In one embodiment, the squeeze ratio of the anamorphic lens group 16 may be 2, for example in an embodiment in which the standard 2.4:1 Panavision widescreen aspect ratio is desired (for a captured 1.2:1 aspect ratio). In one embodiment, the squeeze ratio of the anamorphic lens group 16 may be set to approximately 1.34, for example in an embodiment in which a captured 1.78 aspect ratio is desired, in a manner described in Miyagishima et al., Anamorphic Three-Perforation Imaging System, U.S. Pat. No. 7,148,947, issued Dec. 12, 2006, the entire contents of which are incorporated herein by reference. In one embodiment, the squeeze ratio of the anamorphic lens group 16 may be varied as desired.

Figure 8:
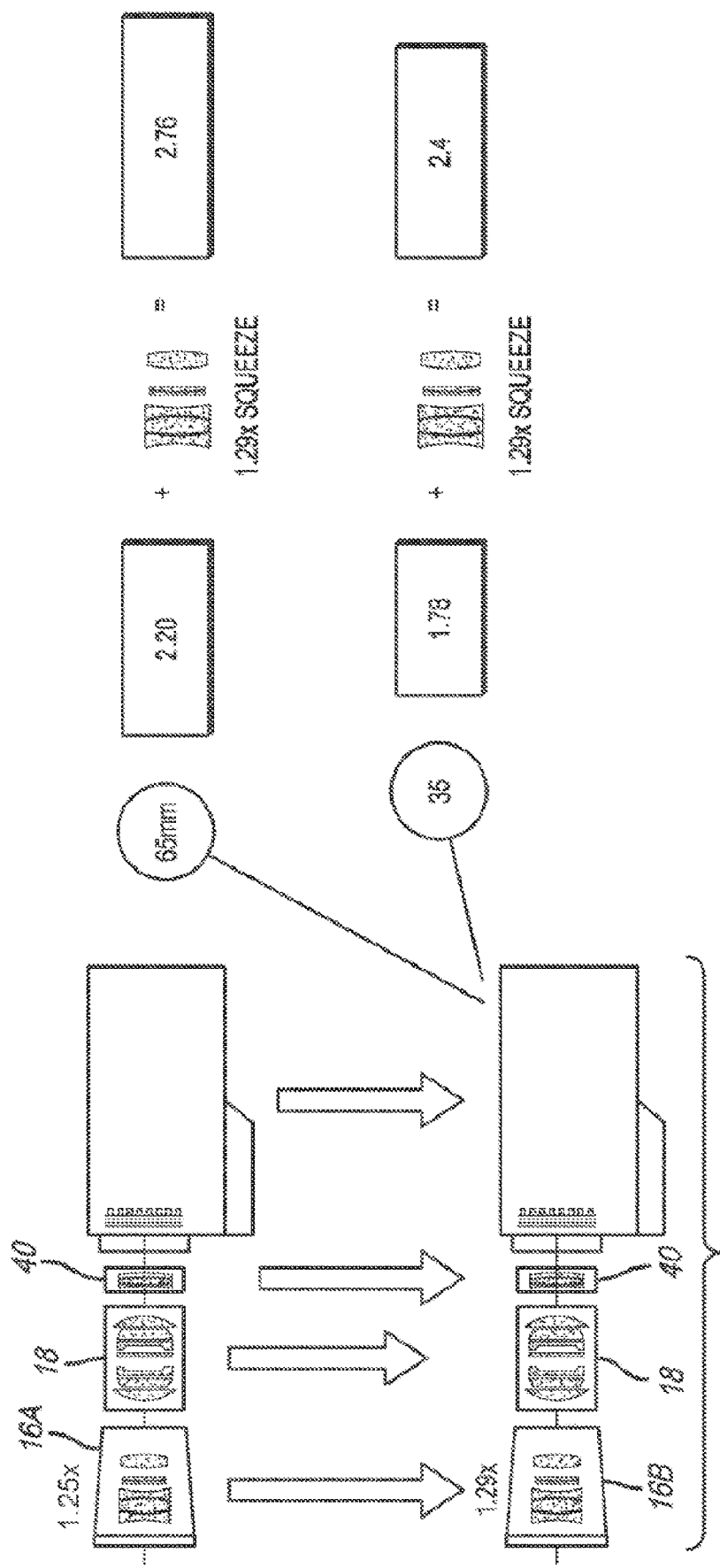
FIG. 8 illustrates a diagram of use of a 1.29 squeeze ratio, according to an embodiment of the present disclosure.

Referring to FIG. 8, in one embodiment, the squeeze ratio of the anamorphic lens group 16a may be varied by about 3% of 1.25, or 1.255, to provide an anamorphic lens group 16b having a squeeze ratio of approximately 1.29. In one embodiment, the 3% adjustment may be achieved by introducing or enhancing the size of an air gap between the front element of the anamorphic lens group 16b and the astigmatizers.

The 1.29 squeeze ratio may be utilized with both a Digital 65 digital image sensor, as well as a Super 35 digital image sensor. In an embodiment in which a Digital 65 digital image sensor is used, the change in compression ratio may be essentially negligible as it is within the compression ratio tolerances that already exist in the anamorphic lens group 16b, for example within the astigmatizers. Accordingly, a 2.76:1 aspect ratio may still result upon expansion.

In an embodiment in which a Super 35 digital image sensor is used, the 1.29 squeeze ratio allows a 2.4:1 image to be captured at a 1.78:1 aspect ratio, with only an approximately 4% loss of use of the active image area. The entire width of the sensor may be used, which allows for a true 4k resolution hybrid 2.4:1 aspect ratio anamorphic scan. This may be an improvement over traditional anamorphic capture at a squeeze ratio of 2, which is currently limited to a 2k resolution.

The captured 1.78 aspect ratio (Super 35), or the captured 2.20 aspect ratio (Digital 65) may be converted to alternative desired aspect ratios in the manner described in Miyagishima et al., U.S. Pat. No. 7,148,947.

In one embodiment, a squeeze ratio of between approximately 1.25 to 1.8 may be utilized. In one embodiment, a squeeze ratio of between approximately 1.3 to 1.8 may be utilized. In one embodiment, greater or lesser squeeze ratios may be utilized. Any of the squeeze ratios disclosed herein may be utilized with a digital image sensor configured to receive the image ranging from a 1.33:1 to 1.9:1 aspect ratio, or from a 1.9:1 aspect ratio to no greater than a 2.76:1 aspect ratio. In one embodiment, greater than a 1.2:1 aspect ratio may be utilized.

The squeeze ratios disclosed herein may be used with an anamorphic lens group 16 or a powered lens group 18 as disclosed herein, and may be used with a corrective lens group 40 as disclosed herein. The squeeze ratios disclosed herein may be used with a digital image sensor 38 as disclosed herein. The size of the digital image sensor and active imaging area of the sensor may have a size as disclosed herein. The digital image sensor may be utilized in combination with or as part of a mobile electronic device.

The processes disclosed herein of capturing an image at a squeeze ratio may be practiced as a method within the scope of this application. In addition, use of the at least one corrective lens element 48 disclosed herein may be practiced as a method within the scope of this application. Other methods disclosed herein may be practiced within the scope of this application. In addition, the at least one corrective lens element 48, separate or in combination with other of the optics disclosed herein may comprise a standalone feature within the scope of this application.

The embodiments disclosed herein may be utilized as part of, or in combination with, a mobile electronic device. The digital camera, and digital camera system, may comprise a digital camera and digital camera system for a mobile electronic device.

In closing, it is to be understood that although aspects of the present specification are highlighted by referring to specific embodiments, one skilled in the art will readily appreciate that these disclosed embodiments are only illustrative of the principles of the subject matter disclosed herein. Therefore, it should be understood that the disclosed subject matter is in no way limited to a particular methodology, protocol, and/or reagent, etc., described herein. As such, various modifications or changes to or alternative configurations of the disclosed subject matter can be made in accordance with the teachings herein without departing from the spirit of the present specification. Lastly, the terminology used herein is for the purpose of describing particular embodiments only, and is not intended to limit the scope of systems, apparatuses, and methods as disclosed herein, which is defined solely by the claims. Accordingly, the systems, apparatuses, and methods are not limited to that precisely as shown and described.

Certain embodiments of systems, apparatuses, and methods are described herein, including the best mode known to the inventors for carrying out the same. Of course, variations on these described embodiments will become apparent to those of ordinary skill in the art upon reading the foregoing description. The inventor expects skilled artisans to employ such variations as appropriate, and the inventors intend for the systems, apparatuses, and methods to be practiced otherwise than specifically described herein. Accordingly, the systems, apparatuses, and methods include all modifications and equivalents of the subject matter recited in the claims appended hereto as permitted by applicable law. Moreover, any combination of the above-described embodiments in all possible variations thereof is encompassed by the systems, apparatuses, and methods unless otherwise indicated herein or otherwise clearly contradicted by context.

Groupings of alternative embodiments, elements, or steps of the systems, apparatuses, and methods are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified encompasses an approximation that may vary. The terms "approximate[ly]" and "substantial[ly]" represent an amount that may vary from the stated amount, yet is capable of performing the desired operation or process discussed herein.

The terms "a," "an," "the" and similar referents used in the context of describing the systems, apparatuses, and methods (especially in the context of the following claims)

are to be construed to cover both the singular and the plural, unless otherwise indicated herein or clearly contradicted by context. All methods described herein can be performed in any suitable order unless otherwise indicated herein or otherwise clearly contradicted by context. The use of any and all examples, or exemplary language (e.g., "such as") provided herein is intended merely to better illuminate the systems, apparatuses, and methods and does not pose a limitation on the scope of the systems, apparatuses, and methods otherwise claimed. No language in the present specification should be construed as indicating any non-claimed element essential to the practice of the systems, apparatuses, and methods.

All patents, patent publications, and other publications referenced and identified in the present specification are individually and expressly incorporated herein by reference in their entirety for the purpose of describing and disclosing, for example, the compositions and methodologies described in such publications that might be used in connection with the systems, apparatuses, and methods. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

What is claimed is:

1. A lens system for use with a digital camera having a digital image sensor, the lens system comprising:
   an anamorphic lens group configured to produce a compressed image in one dimension; and
   a corrective lens group configured to receive the compressed image and improve an optical quality of the compressed image in the one dimension as produced by the digital image sensor.

2. The lens system of claim 1, wherein the corrective lens group is configured to reduce a blurring of the compressed image in the one dimension.

3. The lens system of claim 1, wherein the corrective lens group comprises at least one of an anti-aliasing feature or a toroidal lens element.

4. The lens system of claim 3, wherein the anti-aliasing feature comprises a birefringent material.

5. The lens system of claim 1, wherein the corrective lens group is configured to be positioned along an optical axis with the anamorphic lens group.

6. The lens system of claim 1 further comprising a powered lens group configured to receive the compressed image produced by the anamorphic lens group.

7. The lens system of claim 6, wherein the powered lens group is interposed between the anamorphic lens group and the corrective lens group.

8. The lens system of claim 1, wherein the anamorphic lens group is configured to compress the image by a squeeze ratio between about 1.25 to 1.8.

9. A digital camera comprising a digital image sensor, the digital camera comprising:
   a lens system including an anamorphic lens group and a corrective lens group in an optical axis of the anamorphic lens group;
   wherein the anamorphic lens group is configured to compress an image in one dimension, and the corrective lens group is configured to reduce a blurring of the compressed image in the dimension of compression as produced by the digital image sensor.

10. The digital camera of claim 9, wherein the anamorphic lens group is configured to compress the image in a horizontal or vertical dimension.

11. The digital camera of claim 9, wherein the digital image sensor comprises an anti-aliasing filter.

12. The digital camera of claim 9, wherein the anamorphic lens group is configured to compress the image by a squeeze ratio between about 1.25 to 1.8.

13. The digital camera of claim 9, further comprising a powered lens group interposed between the anamorphic lens group and the corrective lens group.

14. The digital camera of claim 9, wherein the corrective lens includes at least one of a toroidal lens element and an anti-aliasing feature.

15. A method for improving an optical quality of an image as captured by digital camera comprising:
   compressing an image in one dimension by use of an anamorphic lens group; and
   passing the compressed image to a corrective lens group configured to improve the optical quality of the compressed image in the one dimension as captured produced by a digital image sensor of the digital camera.

16. The method of claim 15, wherein during the step of compressing, the anamorphic lens is configured to compress the image by a squeeze ratio between about 1.25 to 1.8.

17. The method of claim 15, wherein during the step of passing, the corrective lens is configured to reduce a blurring of the compressed image in the dimension of compression.

* * * * *